A. CZAJKOWSKI.
SELF OILING COMBINATION PULLEY FRAME AND PULLEY THRUST BEARING.
APPLICATION FILED JUNE 29, 1914.
1,161,198.  Patented Nov. 23, 1915.
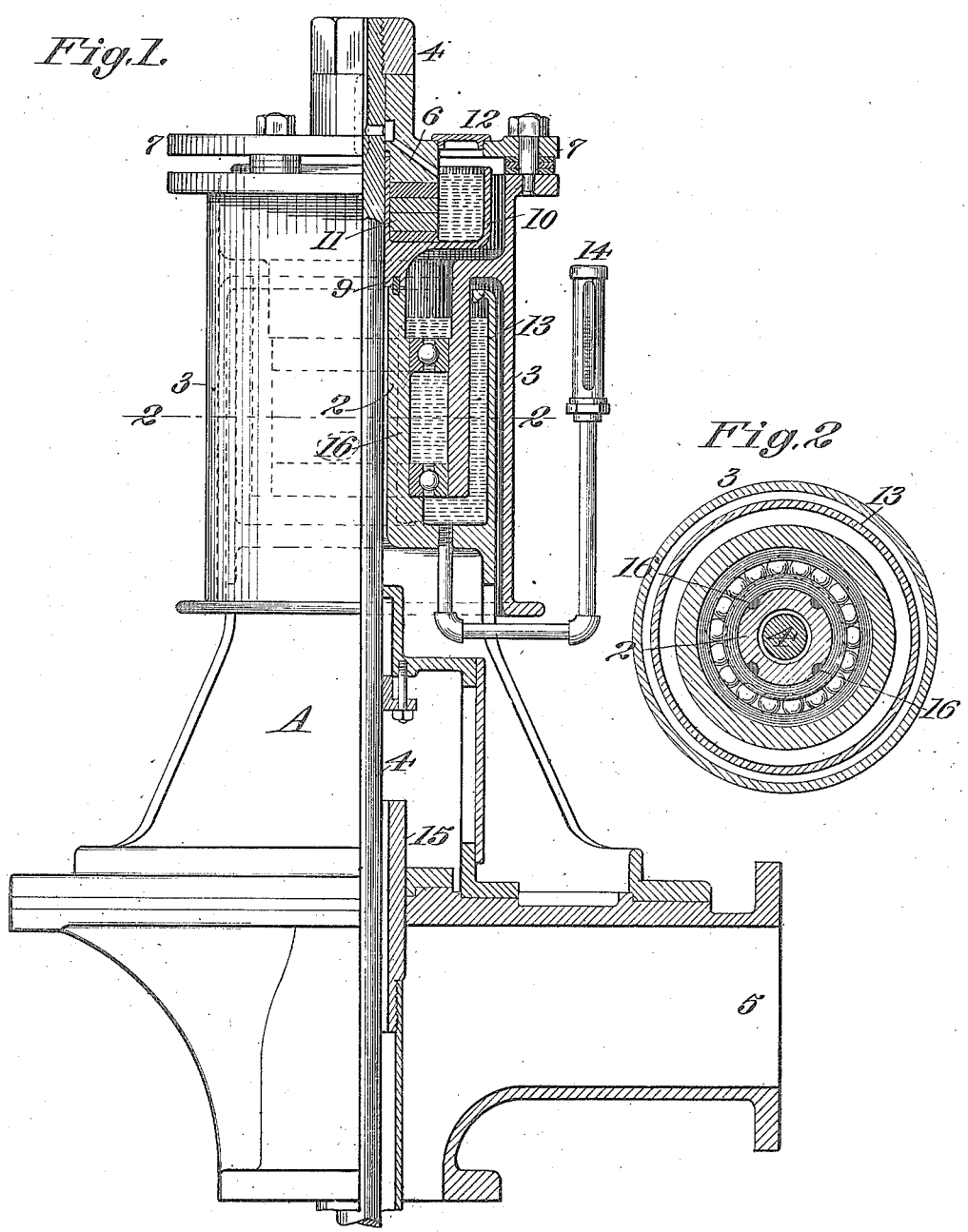
WITNESSES:
Charles Pickles
Thos Laisberg
INVENTOR
Alexander Czajkowski
BY G. H. Strong
ATTORNEY

UNITED STATES PATENT OFFICE.

ALEXANDER CZAJKOWSKI, OF OAKLAND, CALIFORNIA, ASSIGNOR TO BYRON JACKSON IRON WORKS, OF WEST BERKELEY, CALIFORNIA, A CORPORATION OF CALIFORNIA.

SELF-OILING COMBINATION PULLEY-FRAME AND PULLEY THRUST-BEARING.

1,161,198. Specification of Letters Patent. Patented Nov. 23, 1915.

Application filed June 29, 1914. Serial No. 847,889.

*To all whom it may concern:*

Be it known that I, ALEXANDER CZAJKOWSKI, a citizen of the United States, residing at Oakland, in the county of Alameda and State of California, have invented new and useful Improvements in Self-Oiling Combination Pulley-Frames and Pulley Thrust-Bearings, of which the following is a specification.

This invention relates to a self-oiling combination pulley frame and pulley thrust bearing, and pertains especially to means for the transmission of power to operate the impellers of centrifugal pumps.

One of the objects of the present invention is to provide a pulley which is revolubly mounted on a stationary hollow standard or axle, in such a way as to cause the latter to entirely take up all strain exerted upon the pulley without transmitting any of this strain or belt pull to the internal steel shaft connecting to the pump runners below; the pulley driving the internal steel shaft through a flexible coupling so that the internal steel shaft is subjected to torsional strains only, and receives none of the strain on the pulley, no matter how heavy such strain may be. The shaft can, therefore, be made of minimum size, thus permitting a considerable reduction in the length of the bearings with a consequent reduction in friction and gain in general efficiency.

Another object of the present invention is to provide a thrust bearing between the inner shaft and the pulley; and to provide means for automatically lubricating the several bearing surfaces and revolving parts.

Further objects will hereinafter appear.

The invention consists of the parts and the construction and combination of parts as hereinafter more fully described and claimed, having reference to the accompanying drawings, in which—

Figure 1 is a side elevation partly in section. Fig. 2 is a cross section on line 2—2, Fig. 1.

A indicates a pulley frame which is appropriately mounted, with respect to the driving power, and provided with a hollow, non-rotatable hub or standard 2 for the pulley 3. Extending through said hub-frame is the centrally disposed drive shaft 4, which, in the case of a centrifugal pump, carries the impeller or impellers, not here shown; the discharge of the pump being represented at 5.

Secured on the upper end of shaft 4, by the nut 4′, is a combined thrust bearing and coupling flange 6 by which the shaft and pulley are connected to turn in unison through a flexible coupling 7. A cup-shaped flange 10 is suitably secured, as at 9, on the upper end of the hollow standard, and interposed between the bottom of said flange and the lower side of the coupling flange is a thrust bearing 11 of suitable construction. The lower cup-shaped flange is not only provided as a seat for the thrust bearing, but is also adapted to contain lubricating oil which may be entered through a filling opening indicated at 12. The lower end of the hollow standard is similarly provided with an upwardly extending annular flange 13. This forms an annular channel around the hollow standard in which the bearings of the pulley are mounted. This annular channel is also provided as an oil container and this is filled through the connections indicated at 14.

The inner shaft 4, which may be connected with the runners of a deep well pump, or any other suitable mechanism, may be guided by bearings 15. These bearings are, however, in the present instance relieved from all side strain, due to belt pull, as this strain is in the present instance entirely taken up by the hollow standard 2. The flexible coupling 7 forms a connection between shaft 4 and the pulley by which a revolving movement is transmitted from one to the other and no matter how heavy the strain on the pulley may be, due to belt pull, such strain can never be transmitted to the inner shaft, and it, therefore, can be made of minimum size, accomplishing a reduction in friction and a corresponding increase in efficiency. The arrangement of the thrust bearing, together with the arrangement of the annular flanges 10 and 13, permits these bearings to be completely submerged in the lubricating oil which cannot leak or escape, as no stuffing boxes are provided.

Grooves 16, formed on the exterior surface of the standard 2, are provided to permit the oil in the lower bowl to find its way to the top of the pulley bearings, thus insuring that these will be completely immersed at all times. A perfect automatic lubricating system is thus secured, together with simplicity of construction and arrangement.

The materials and finish and the arrangement of the several parts are such as the experience and judgment of the manufacturer may dictate.

Having thus described my invention, what I claim and desire to secure by Letters Patent is—

1. A combination self-oiling pulley frame and thrust bearing for drive shafts, consisting in the combination of a stationary hollow axle, a drive shaft extending therethrough, said axle being provided with an external annular cup flange open at the top and forming an oil reservoir, a pulley on the axle having a hub running in the oil reservoir, a cap flange secured to the axle and extending over the open end of the cup when the pulley is in place on the axle, a flange secured to the shaft and connected to the pulley, and thrust bearings between the last mentioned flange and the said cap flange.

2. The combination of a stationary, hollow axle provided with an external annular oil reservoir, a pulley revolubly mounted on said axle and having an internal hub running in said reservoir, a drive shaft extending through said axle, and a flexible connection between said pulley and said shaft, whereby said axle is caused to take up all strain exerted upon said pulley.

In testimony whereof I have hereunto set my hand in the presence of two subscribing witnesses.

ALEXANDER CZAJKOWSKI.

Witnesses:
  E. L. Osborn,
  H. J. Ellen.